United States Patent
Taylor (10) Patent No.: US 7,248,836 B2
(45) Date of Patent: Jul. 24, 2007

(54) RF CHANNEL LINKING METHOD AND SYSTEM

(75) Inventor: Ronald Taylor, Wheaton, IL (US)

(73) Assignee: Schlage Lock Company, Carmel, IN (US)

(*) Notice: Subject to any disclaimer, the term of this patent is extended or adjusted under 35 U.S.C. 154(b) by 1081 days.

(21) Appl. No.: 10/261,933

(22) Filed: Sep. 30, 2002

(65) Prior Publication Data

US 2003/0143956 A1  Jul. 31, 2003

Related U.S. Application Data

(60) Provisional application No. 60/326,338, filed on Sep. 30, 2001, provisional application No. 60/326,316, filed on Sep. 30, 2001, provisional application No. 60/326,299, filed on Sep. 30, 2001, provisional application No. 60/326,298, filed on Sep. 30, 2001, provisional application No. 60/326,296, filed on Sep. 30, 2001, provisional application No. 60/326,295, filed on Sep. 30, 2001, provisional application No. 60/326,294, filed on Sep. 30, 2001, provisional application No. 60/326,201, filed on Sep. 30, 2001, provisional application No. 60/326,179, filed on Sep. 30, 2001.

(51) Int. Cl.
  H04Q 7/20 (2006.01)
  H04B 17/00 (2006.01)
(52) U.S. Cl. .................................. 455/67.1
(58) Field of Classification Search ............... 455/67.1, 455/522
  See application file for complete search history.

(56) References Cited

U.S. PATENT DOCUMENTS

| 528,589 A | 11/1894 | Brownell et al. |
| 1,946,384 A | 2/1934 | Baril et al. |
| 3,967,478 A | 7/1976 | Guinn |
| 4,048,630 A | 9/1977 | Deming et al. |
| 4,357,601 A | 11/1982 | McWilliams |
| 4,539,555 A | 9/1985 | Tefka |
| 4,557,121 A | 12/1985 | Charlton |

(Continued)

FOREIGN PATENT DOCUMENTS

FR   2749607   12/1997

(Continued)

Primary Examiner—William D. Cumming
(74) Attorney, Agent, or Firm—Michael Best & Friedrich LLP (57) ABSTRACT

In an RF access control system, a method for establishing a reliable RF signal link between points of the RF access control system. A first RF signal from a first point of the system is transmitted to a second point of the system at a first RF power level that is below a second RF power level used during normal operation of the RF access control system. Once the second point acknowledges the RF signal from the first point, then a pre-determined number of RF packets are transmitted and received back and forth between the first point and the second point at the first RF power level. An RF packet error count is generated in response to the transmitting and receiving of the pre-determined number of RF packets. If this error count is below a certain threshold value, then an indication is provided to an installer of the RF access control system of an RF channel number to be used by the RF access control system during normal operation.

20 Claims, 5 Drawing Sheets

U.S. PATENT DOCUMENTS

| | | |
|---|---|---|
| 4,579,376 A | 4/1986 | Charlton |
| 4,634,155 A | 1/1987 | Geringer et al. |
| 4,672,365 A | 6/1987 | Gehman et al. |
| 4,677,834 A | 7/1987 | Hicks |
| D306,806 S | 3/1990 | Hill |
| 4,967,478 A | 11/1990 | Sherman |
| 5,009,456 A | 4/1991 | Eck |
| 5,019,803 A | 5/1991 | Maram |
| 5,075,608 A | 12/1991 | Erdman et al. |
| 5,095,654 A | 3/1992 | Eccleston |
| 5,148,691 A | 9/1992 | Walldén |
| 5,184,349 A | 2/1993 | Riordan |
| 5,263,347 A | 11/1993 | Allbaugh et al. |
| 5,308,131 A | 5/1994 | Galindo et al. |
| 5,313,812 A | 5/1994 | Eklund et al. |
| 5,410,444 A | 4/1995 | Juds |
| 5,418,839 A | 5/1995 | Knuth et al. |
| RE35,124 E | 12/1995 | Erdman et al. |
| 5,475,375 A | 12/1995 | Barrett et al. |
| 5,479,151 A | 12/1995 | Lavelle et al. |
| 5,491,471 A | 2/1996 | Stobbe |
| 5,497,411 A | 3/1996 | Pellerin |
| 5,531,086 A | 7/1996 | Bryant |
| 5,577,229 A | 11/1996 | Wakerly |
| 5,602,536 A | 2/1997 | Henderson et al. |
| 5,608,298 A | 3/1997 | Frolov et al. |
| 5,611,582 A | 3/1997 | Frolov et al. |
| 5,682,135 A | 10/1997 | LaBonde |
| 5,683,127 A | 11/1997 | Chamberlain |
| 5,705,991 A | 1/1998 | Kniffin et al. |
| 5,722,276 A | 3/1998 | Aigner et al. |
| 5,729,198 A | 3/1998 | Gorman |
| 5,769,472 A | 6/1998 | Small |
| 5,774,059 A | 6/1998 | Henry et al. |
| 5,791,178 A | 8/1998 | Chamberlain et al. |
| D397,993 S | 9/1998 | Jimenez |
| 5,808,296 A | 9/1998 | McMonagle et al. |
| 5,812,782 A | 9/1998 | Jackson |
| 5,847,662 A | 12/1998 | Yokota et al. |
| 5,867,095 A | 2/1999 | Klein et al. |
| 5,884,145 A | 3/1999 | Haartsen |
| 5,901,361 A | 5/1999 | Luong |
| 5,933,086 A | 8/1999 | Tischendorf et al. |
| 5,936,544 A | 8/1999 | Gonzales et al. |
| 5,941,106 A | 8/1999 | Williamson, Jr. et al. |
| 5,974,367 A | 10/1999 | Bianco |
| 6,035,676 A | 3/2000 | Hudspeth |
| 6,038,896 A | 3/2000 | Chamberlain et al. |
| 6,076,385 A | 6/2000 | Pedroso et al. |
| 6,167,251 A | 12/2000 | Segal et al. |
| 6,167,934 B1 | 1/2001 | Debroche |
| 6,185,415 B1 | 2/2001 | Boatwright |
| 6,189,351 B1 | 2/2001 | Eagan et al. |
| 6,237,028 B1 | 5/2001 | Jackson |
| 6,259,352 B1 | 7/2001 | Yulkowski et al. |
| 6,260,392 B1 | 7/2001 | Geiger |
| 6,285,295 B1 | 9/2001 | Casden |
| 6,297,725 B1 | 10/2001 | Tischendorf et al. |
| 6,326,754 B1 | 12/2001 | Mullet et al. |
| 6,330,817 B1 | 12/2001 | Frolov |
| 6,347,486 B1 | 2/2002 | Badillet |
| 6,352,202 B2 | 3/2002 | Takiguchi et al. |
| 6,359,547 B1 | 3/2002 | Denison et al. |
| 6,377,608 B1 | 4/2002 | Zyren |
| 6,392,537 B1 | 5/2002 | Tazumi et al. |
| RE37,784 E | 7/2002 | Fitzgibbon et al. |
| 6,434,985 B1 | 8/2002 | Walmsley |
| 6,486,793 B1 | 11/2002 | Buccola |
| 6,776,332 B2 | 8/2004 | Allen et al. |
| 6,828,902 B2 | 12/2004 | Casden |
| 2001/0021639 A1 | 9/2001 | Kaku |
| 2001/0055283 A1 | 12/2001 | Beach |
| 2002/0163430 A1 | 11/2002 | Bergman et al. |
| 2002/0180582 A1 | 12/2002 | Nielsen |
| 2003/0025082 A1 | 2/2003 | Brewington et al. |
| 2003/0096607 A1 | 5/2003 | Taylor |
| 2003/0098778 A1 | 5/2003 | Taylor et al. |
| 2003/0098779 A1 | 5/2003 | Taylor et al. |
| 2003/0100266 A1 | 5/2003 | Wiemeyer et al. |
| 2003/0103472 A1 | 6/2003 | Taylor et al. |
| 2003/0143956 A1* | 7/2003 | Taylor ...................... 455/67.1 |
| 2004/0099723 A1 | 5/2004 | Robertson |
| 2004/0236547 A1 | 11/2004 | Rappaport et al. |
| 2005/0003812 A1 | 1/2005 | Gladwin et al. |

FOREIGN PATENT DOCUMENTS

| | | |
|---|---|---|
| WO | WO 02/25040 | 3/2002 |

\* cited by examiner

RF CHANNEL LINKING METHOD AND SYSTEM

RELATED APPLICATIONS

The present application claims priority to the following provisional applications, all filed Sep. 30, 2001: Application No. 60/326,338, entitled "RF Channel Linking Method And System"; Application No. 60/326,299, entitled "Energy Saving Motor-Driven Locking Subsystem"; Application No. 60/326,201 entitled "Cardholder Interface For An Access Control System"; Application No. 60/326,316, entitled "System Management Interface For Radio Frequency Access Control"; Application No. 60/326,298 entitled "Power Management For Locking System"; Application No. 60/326,179, entitled "General Access Control Features For A Rf Access Control System"; Application No. 60/326,296, entitled "RF Wireless Access Control For Locking System"; Application No. 60/326,294, entitled "Maintenance/Trouble Signals For A RF Wireless Locking System"; and Application No. 60/326,295, entitled "RF Dynamic Channel Switching Method."

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The preferred embodiments of the present invention relate to an RF access control system for controlling access to an access point. More specifically, the preferred embodiments of the present invention relate to a system and method for establishing a reliable wireless link between two components of the wireless access control system.

A wireless access control system may provide several advantages over a traditional, wire-based access control system. In a traditional, wired access control system, each access point, such as a door, for example, is equipped with a locking module to secure the access point. Each locking module is in turn directly wired to a remote access control module. The access control module is typically a database that compares a signal received from the locking module to a stored signal in the database in order to determine an access decision for that locking module. Once the access decision has been determined by the access control module, the decision is relayed to the locking module through the wired connection.

The use of wired connections between the access control module and the locking module necessitates a large investment of time and expense in purchasing and installing the wires. For example, for larger installations, literally miles of wires must be purchased and installed. An access control system that minimizes the time and expense of the installation would be highly desirable.

Additionally, wire-based systems are prone to reliability and security failures. For example, a wire may short out or be cut and the locking module connected to the access control module by the wire may no longer be under the control of the access control module. If a wire connection is cut or goes, the only alternative is to repair the faulty location (which may not be feasible) or run new wire all the way from the access control module to the locking module, thus incurring additional time and expense. Conversely, an access control system that provides several available communication channels between the locking module and the access control module so that if one communication channel is not usable, communication may proceed on one of the other communication channels, would also be highly desirable, especially if such an access control system did not add additional costs to install the additional communication channels.

A wireless access system providing a wireless communication channel between the locking module and the access control module may provide many benefits over the standard, wire-based access control system. Such a wireless access system is typically less expensive to install and maintain due to the minimization of wire and the necessary installation time. Additionally, such a system is typically more secure because communication between the locking module and the access control module is more robust that a single wire.

However, one difficulty often encountered in installing and maintaining such a wireless access system is maintaining a wireless communication link between the locking module and the access control module in spite of a constantly-changing interference condition between the modules. For example, the wireless link between the modules may be susceptible to interference from environmental conditions or transient electrical impulses.

Consequently, a single RF channel between the modules may become comprised during use. A system that provides multiple wireless channels between the modules would be highly desirable. Additionally, a system that would automatically detect desirable channels between the modules would be highly desirable. Also, a system that would determine a new channel for communication if the old channel became corrupted or lost would also be highly desirable.

BRIEF SUMMARY OF THE INVENTION

One aspect of the embodiment is a method and system for establishing a reliable RF signal link between points of an RF access control system. A first RF signal from a first point of the system is transmitted on an RF channel to a second point of the system at a first RF power level during a linking mode that is below a second RF power level used during a normal operation mode of the RF access control system. Once the second point acknowledges the RF signal from the first point, then a pre-determined number of RF packets are transmitted and received back and forth on this RF channel between the first point and the second point at the first RF power level. An RF packet error count is generated in response to the transmitting and receiving of the pre-determined number of RF packets. If this error count is below a certain threshold value, then an indication of an RF channel number to be used by the RF access control system during normal operation is provided to an installer of the RF access control system. These and other features of the present invention are discussed in the following detailed description of the preferred embodiments of the invention.

DETAILED DESCRIPTION OF THE INVENTION

The present application is directed toward a portion of a wireless access system. Additional disclosure of the wireless access system may be found in the following co-filed applications which are hereby incorporated by reference in their entirety: application Ser. No. 10/262,207, entitled "Energy Saving Motor-Driven Locking Subsystem" filed Sep. 30, 2002; application Ser. No. 10/262,509, entitled "Cardholder Interface for an Access Control System" filed Sep. 30, 2002; application Ser. No. 10/262,196, entitled "System Management Interface for Radio Frequency Access Control" filed Sep. 30, 2002; application Ser. No. 10/262,194, entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application Ser. No. 10/262,508, entitled "Maintenance/Trouble Signals for a RE Wireless Locking System" filed Sep. 30, 2002; and application Ser. No. 10/262,249, entitled "RF Dynamic Channel Switching Method" filed Sep. 30, 2002.

Figure 1:
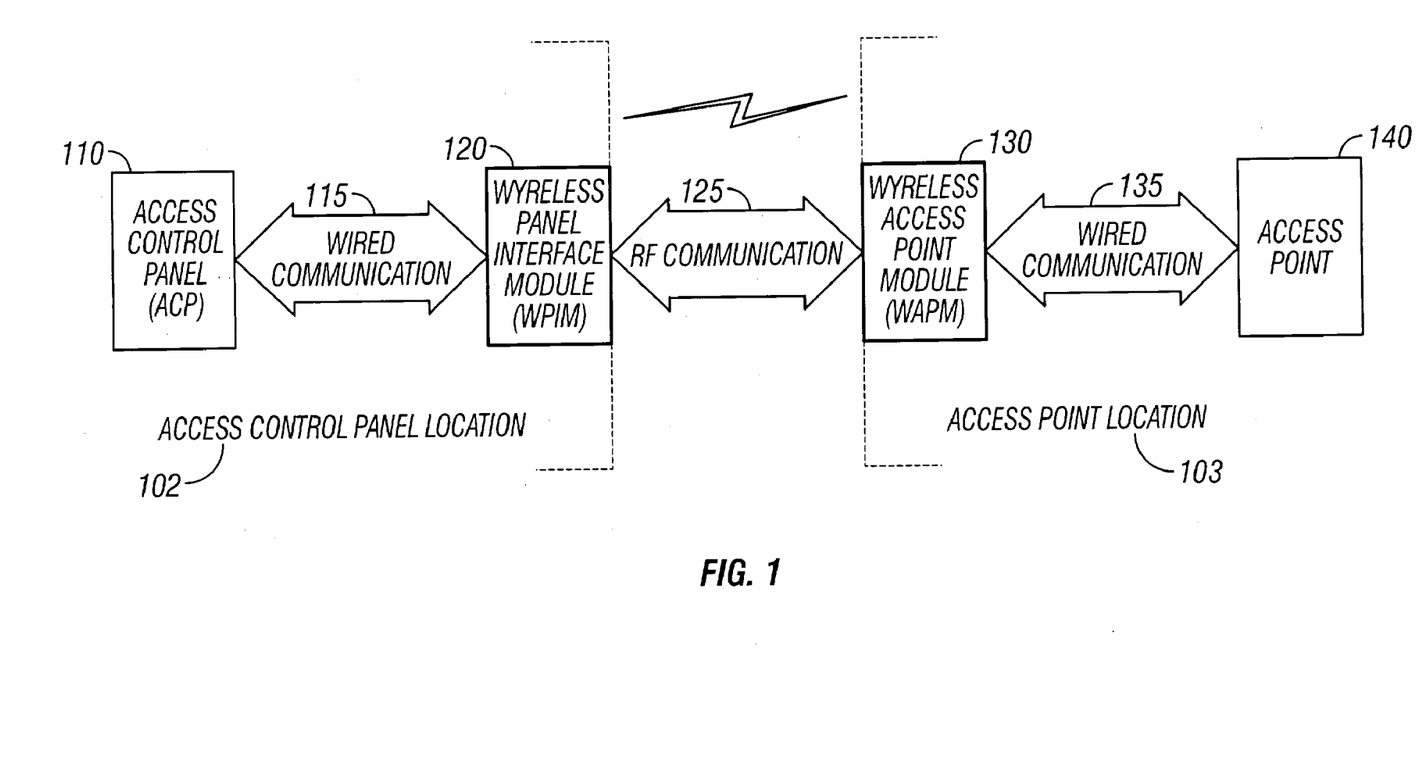
FIG. 1 illustrates a block diagram of the components of a wireless access system according to a preferred embodiment of the present invention.

FIG. 1 illustrates a block diagram of the components of a wireless access system 100 according to a preferred embodiment of the present invention. The wireless access system 100 includes several components installed at one of two generalized locations, an access control panel location 102 and an access point location 103. The access control panel location 102 includes an access control panel (ACP) 110 and a Wireless Panel Interface Module (WPIM) 120. The access point location 103 includes a Wireless Access Point Module (WAPM) 130 and an access point 140. The access control panel 110 communicates with the WPIM 120 through a bi-directional wired communication link 115. The WPIM 120 communicates with the WAPM 130 through a bi-directional RF communication link 125. The WAPM 130 communicates with the access point 140 through a bi-directional wired communication link 135. The access point 140 is preferably a door or portal, but may be a container, secure location, or a device of some kind, for example.

In operation, an access signal is read at the access point 140. The access signal may be a signal from an access card, for example, a magnetic stripe or Wiegand access card. Alternatively, the access signal may be a biometric or a numeric sequence or some other access signal. The access signal is relayed from the access point 140 to the WAPM 130 through the wired communication link 135. As further described below, the access point 140 may be integrated into the WAPM 130 to form a single component or may be a separate component wired to the WAPM 130.

Once the WAPM 130 receives the access signal from the access point 140, the WAPM 130 transmits the access signal to the WPIM 120 over the RF communication link 125. The WPIM 120 receives the access signal and relays the access signal to the ACP 110 over the wired communication link 115.

Figure 2:
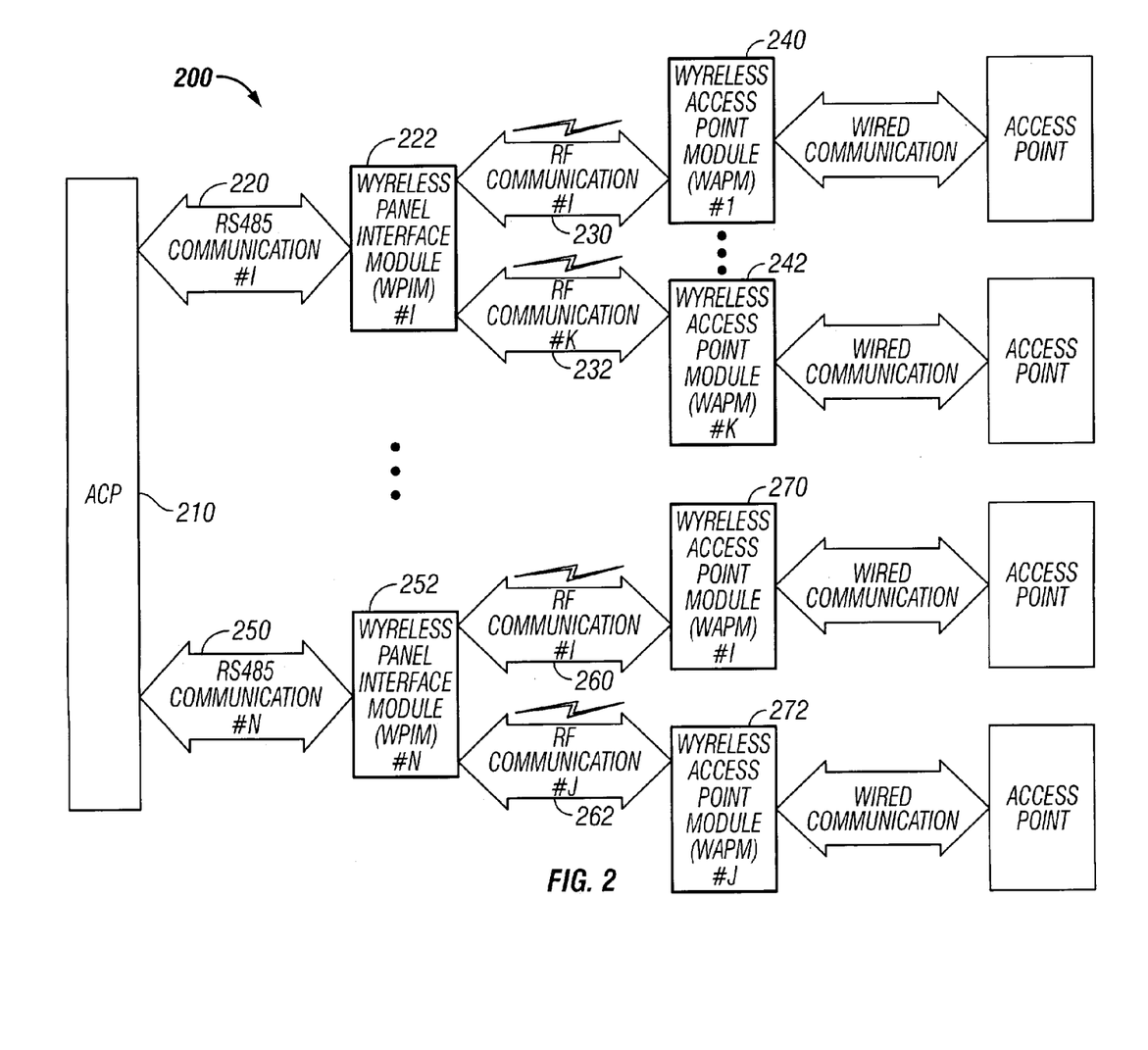
FIG. 2 illustrates a block diagram of the components of an expanded wireless access system according to a preferred embodiment of the present invention.

FIG. 2 illustrates a block diagram of the components of an expanded wireless access system 200 according to a preferred embodiment of the present invention. The expanded wireless access system 200 includes an ACP 210, multiple wired communication links 220, 222 numbered 1 to N, multiple WPIMs 222, 252 numbered 1 to N, multiple RF communication links 230, 2323, 260, 262 numbered 1 to K and 1 to J, and multiple WAPMs 240, 242, 270, 272 numbered 1 to K and 1 to J. The expanded wireless access system 200 is similar to the access system 100 of FIG. 1, and includes the same components, but has been expanded to include multiple access points, WAPMs, and WPIMs.

In the expanded wireless access system 200, a single ACP 210 communicates with a number N of WPIMs 222, 252 over a number N of wired communication links 220, 250. That is, the ACP supports communication with and provides access decisions for plurality of WPIMs 222, 252. Each WPIM 222, 252 may in turn support a plurality of WAPMs 240, 242, 270, 272 each WAPM positioned at a single access point. For example, WPIM #1 communicates with a number K of WAPMs 240, 242 over a number K of RF communication links 230, 232. Additionally, WPIM #N communicates with a number J of WAPMs 270, 272 over a number J of RF communication links 260, 262.

In a preferred embodiment, the ACP 210 supports three WPIMs and each PIM can support up to six WAPMs. However, as more advanced and configurable systems are developed, the total numbers of WPIMs and WAPMs supported is expected to rise. Additionally, the N wired communication links 220, 250 are illustrated as the preferred embodiment of RS486 communication links. Alternatively, other well-known communication protocols may be employed.

Figure 3:
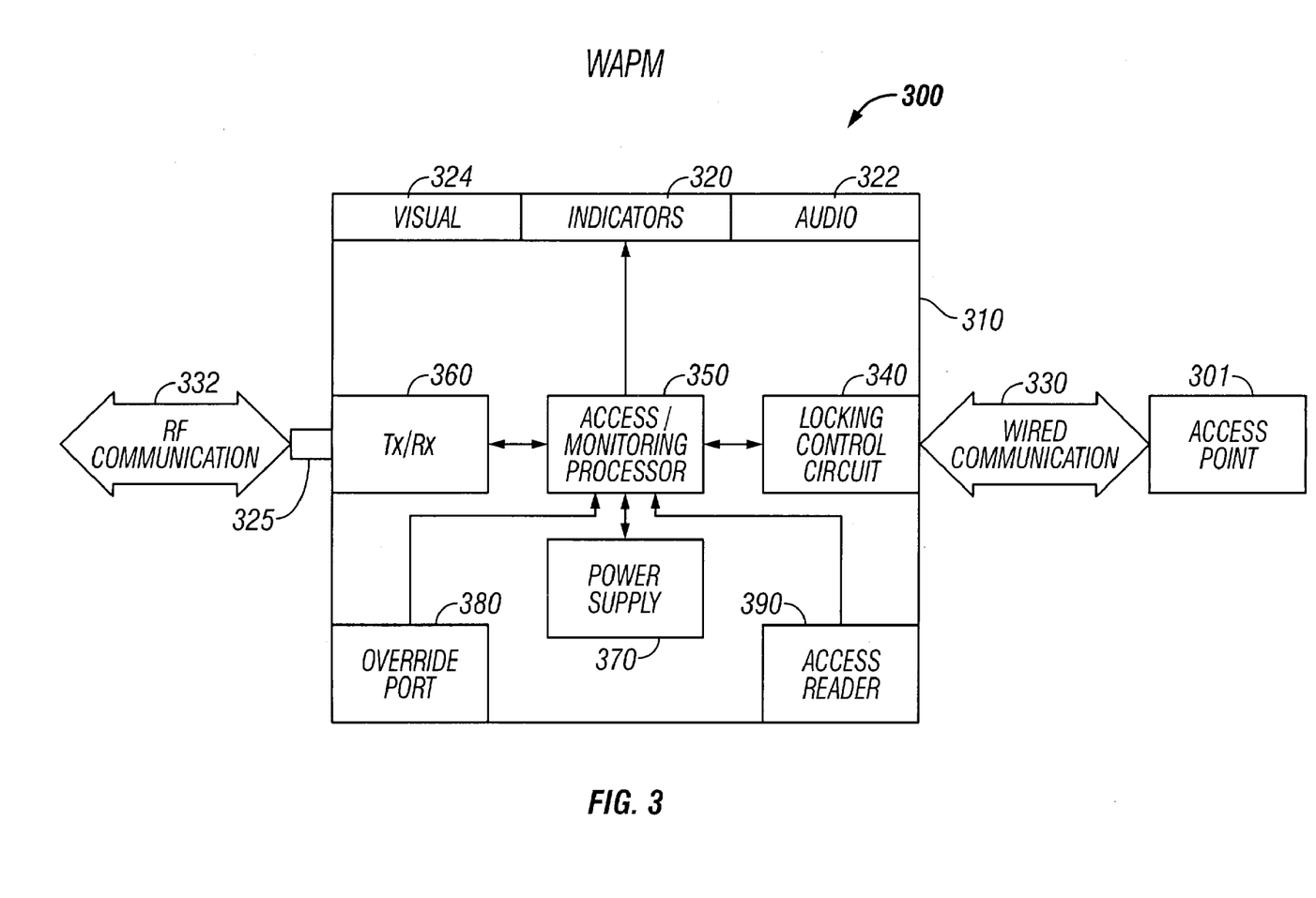
FIG. 3 illustrates a Wireless Access Point Module (WAPM) for the wireless access system of FIG. 1 according to a preferred embodiment of the present invention.

FIG. 3 illustrates a Wireless Access Point Module (WAPM) 300 for the wireless access system 100 of FIG. 1 according to a preferred embodiment of the present invention. The WAPM 300 includes a housing 310, indicators 320, a wired communication link 330, a RF communication link 332, and an antenna 325. The housing 310 includes a locking control circuit 340, an access/monitoring processor 350, a transceiver 360, a power supply 370, an override port 380, and an access reader 390. The indicators 320 may include one or both of an audio indicator 322 and a visual indicator 324. An access point 301 is also shown in FIG. 3.

The power supply 370 provides power to all of the other systems of the housing 310, including the transceiver 360, the locking control circuit 340, and the access/monitoring processor 350. The power supply 370 may be an internal battery or other internal type of power supply. Alternatively, an AC power supply may be employed. The transceiver 360 is coupled to the antenna 325 to allow signals to be sent and received from the housing 310 to an external point such as a WPIM through the RF communication link 332. The locking control circuit 340 is coupled to the access point 301 and provides locking control signals to the access point 301 through the wired communication link 330. Additionally, the locking control circuit 340 may receive feedback from the access point 301 through the wired communication link 330, for example to verify that the access point is secured. The access reader 390 receives access signals such as from an integrated card reader or other access device, for example. The indicators 320 may provide a visual or audio indication, for example of the state of the WAPM 300 or that an access signal has been read by the access reader 390.

In operation, an access signal may be received from the access reader 390. The access signal is then relayed to the access/monitoring processor 350. The access/monitoring processor 350 then sends the access signal to the transceiver 360. The transceiver 360 transmits the access signal to WPIM 120 of FIG. 1 that is interfaced to the ACP 110. As further explained below, the ACP 110 includes a database of authorized access signals. If the access signal received from the WAPM 300 is determined by the ACP 110 to be a signal corresponding to an authorized user, a confirmation is transmitted from the ACP 110 to the WPIM 120 and then to the transceiver 360 of the WAPM 300. The confirmation is relayed from the transceiver 360 to the access/monitoring processor 350. The access/monitoring processor 350 then sends a locking control signal to the locking control unit 340. When the locking control unit 340 receives the locking control signal, the locking control unit 340 activates the access point 301 through the wired communication link 330 to allow access. The indicators 320 may be a visual or audible signal that the housing 310 has read an access signal, transmitted the access signal to the remote access control panel, received a confirmation, or activated the locking member, for example.

The WAPM 300 may include several variations. For example, the WAPM may be an Integrated Reader Lock (IRL), a Wireless Reader Interface (WRI), a Wireless Integrated Strike Interface (WISI), a Wireless Universal Strike Interface (WUSI), or a Wireless Portable Reader (WPR). The IRL includes an integrated access reader and lock. That is, the IRL is similar to FIG. 3, but includes the access point as part of the housing. The WRI is similar to the IRL, but does not include an integrated access reader and instead receives signals from a third party access reader. The WISI includes an integrated reader and lock and is mounted directly into the strike of the access point, such as a door, for example. The WUSI is similar to the WISI, but does not include an integrated reader and lock and may instead be connected to a third party reader and/or lock. The WPR is a portable reader that may be taken to a remote location and determine access decisions at the remote location, for example, for security checks or badging checks.

Figure 4:
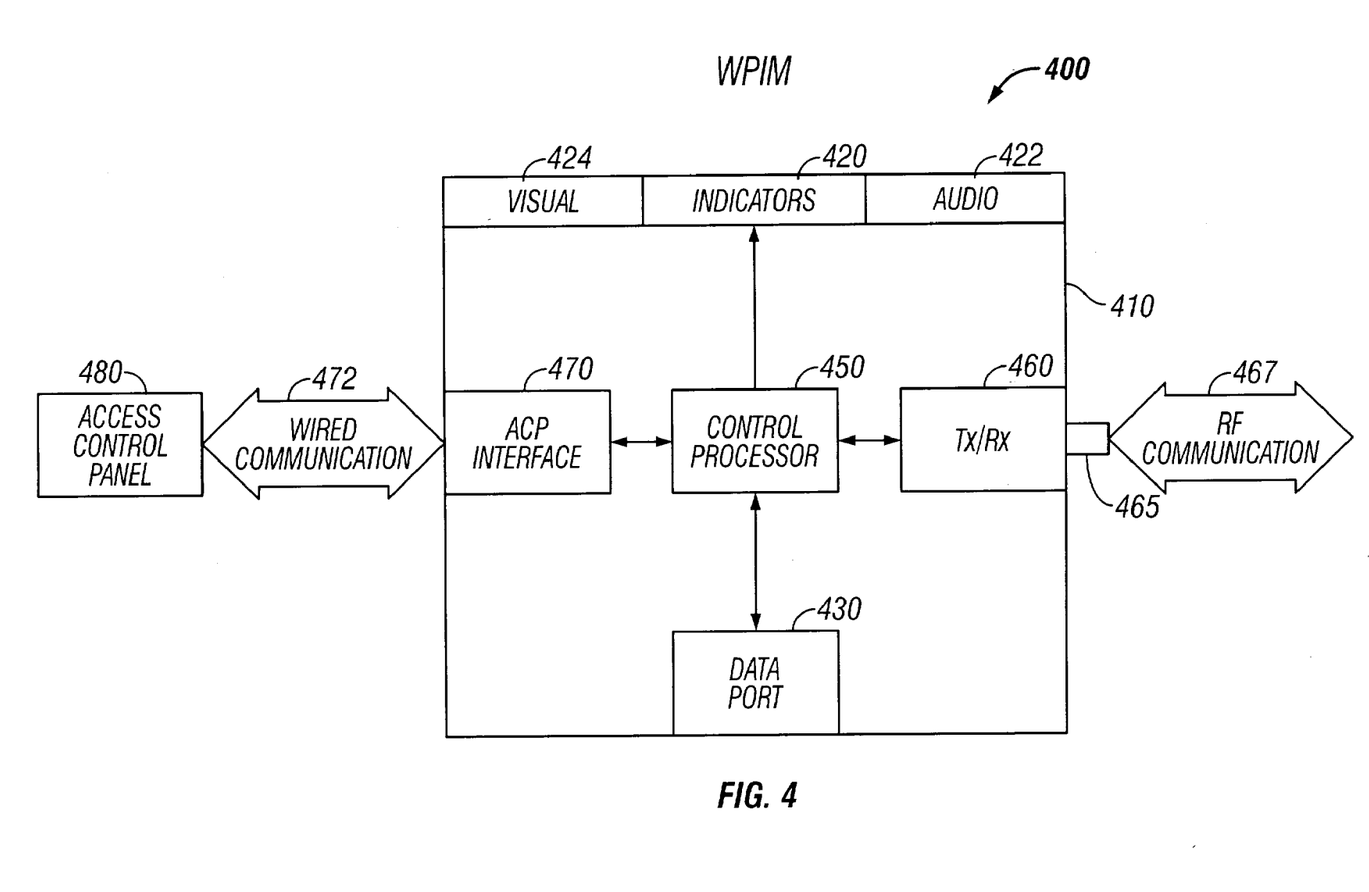
FIG. 4 illustrates a WPIM for the wireless access system of FIG. 1 according to a preferred embodiment of the present invention.

FIG. 4 illustrates a WPIM 400 for the wireless access system 100 of FIG. 1 according to a preferred embodiment of the present invention. The WPIM 400 includes a housing 410, an antenna 465, and indicators 420. The housing 410 includes a data port 430, a control processor 450, a transceiver 460 and an ACP interface 470. FIG. 4 also shows an RF communication link 467, a wired communication link 472, and an ACP 480.

Power is typically supplied to the WPIM via an AC power supply or through the wired communication 472. The transceiver 460 is coupled to the antenna 465 to allow signals to be sent and received from the housing 410 to an external point such as a WAPM through the RF communication link 467. The ACP 480 is coupled to the WPIM 400 through the wired communication link 472. The data port 430 is coupled to the control processor 450 to allow an external user such as a technician, for example, to interface with the control processor. The indicators 420 may provide a visual or audio indication, for example of the state of the WPIM 400 or that an access signal has been passed to the ACP 480 or an authorization passed to a WAPM 300.

In operation, the WPIM 400 receives access signals from the WAPM 300 through the antenna 465 and transceiver 460. The WPIM relays the access signals to the ACP 480 for decision making. Once the access decision has been made, the ACP 480 transmits the access decision through the wired communication link 472 to the WPIM 400. The WPIM 400 then transmits the access decision to the WAPM 300.

As mentioned above, the WPIM 400 includes a data port 430. The data port 430 is preferably an RS485 port. The data port 430 may be used, for example, by an operator to connect a computer to the WPIM 400 to perform various tasks, such as configuring the WPIM 400, for example. Some exemplary WPIM items for configuration include the transmission frequency for the communication link with the WAPM and the performance of the indicators 420.

Additionally, configuration information may be received by the data port 430 of the WPIM 400 and relayed to the WAPM 300 via the transceiver 460. The configuration information that is received by the WAPM 300 may then by relayed to the access/monitoring processor 350 of the WAPM 300 for implementation at the WAPM 300.

The WPIM may include several variations including a panel interface module (PIM) and a panel interface module expander (PIME). As mentioned above, a single PIM may communicate with multiple WAPMs. Additionally, the housing for the PIM is preferably constructed to allow additional PIM modules to be installed in the PIM housing to form the PIME. Because the PIME includes multiple PIM modules, the PIME may service more access points.

Figure 5:
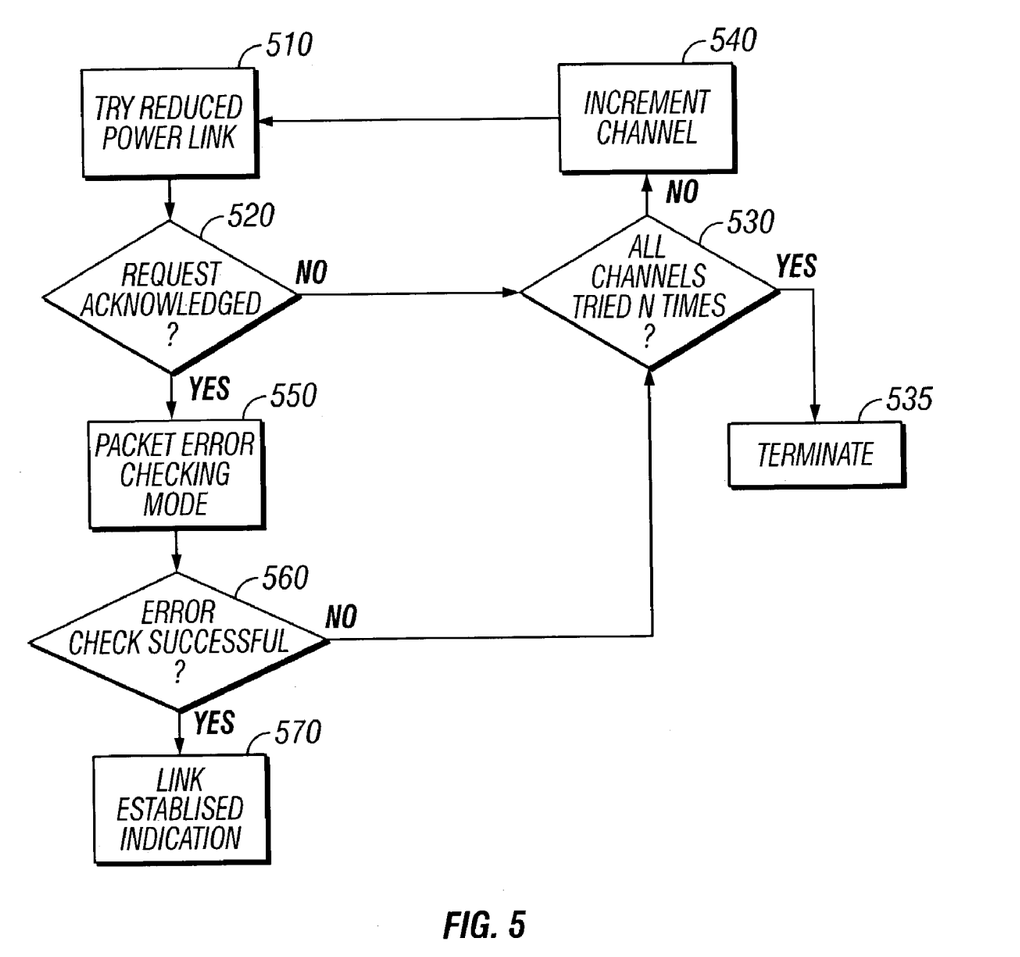
FIG. 5 illustrates a flowchart for establishing the RF communication link between a WPIM and a WAPM.

FIG. 5 illustrates a flowchart 500 for establishing the RF communication link between a WPIM and a WAPM. For example, when the WPIM and WAPM are initially installed, the WPIM and WAPM must establish communication so that access requests may be relayed from the WAPM to the WPIM and access decisions may be relayed from the WPIM to the WAPM. Once the WAPM and WPIM have established a communication link, the WAPM and WPIM typically continue to use the communication link until the link is lost or an instruction is received to use another communication link. Thus, the linking procedure need not be accomplished before every communication between the WPIM and WAPM.

Preferably, a plurality of RF communication channels are available between the WPIM and WAPM so that the WPIM and WAPM may change channels if a channel is corrupted by interferences, for example atmospheric interference. In a preferred embodiment, the 15 RF communication channels are available.

The RF communication link between the WPIM and WAPM preferably uses direct sequence spread spectrum modulation techniques to transmit and receive in half-duplex. Direct sequence spread spectrum modulation is a bandwidth spreading technique achieved by multiplying an information signal by a direct sequence modulation. The direct sequence modulation is a signal formed by linearly modulating the output sequence of a pseudo-random (PN) number generator onto a train of pulses. In this way, transmission and reception can occur on one RF channel used by more than one pair of WPIMs and WAPMs This technique also has the effect of minimizing interference and noise on the RF channel used. Both the WPIM and WAPM must know the PN code used. The PN code is preferably preselected and fixed in the firmware of the WPIM and WAPM. The PN codes that are employed are preferably carefully chosen to provide optimal signal decoding at the receive end.

To transmit a signal from the WPIM to the WAPM, the information signal or packet is modulated (encoded) with a direct sequence modulation and sent to the WAPM. The WAPM receives the encoded signal and the same pseudo-random code is used to "unspread" or "decode" the received signal. Information between the WPIM and WAPM is exchanged using this technique and information is transmitted in the form of packets in half-duplex. Half-duplex means that, for example, when the WPIM is transmitting, the WAPM is only receiving and vice versa. A packet of information is a group of bits that is modulated onto an RF carrier to be transmitted between the WPIM and WAPM. In other words, a packet is a pre-defined segment of information.

Turning now to FIG. 5, in order to establish a communication link between the WPIM and the WAPM, the WPIM is first set to a link mode in which the WPIM is awaiting an initial contact from the WAPM. Then, at step 510, the WPIM and the WAPM enter a reduced power linking mode to attempt to establish a communication link over one of a variety of communication channels, as further described below. That is, the WAPM transmits a linking request signal to the WPIM at a power less than the standard transmission power. Turning to step 520, if the linking request signal is acknowledged by the WPIM, the WAPM enters a packet error checking mode at step 550.

If the linking request signal is not acknowledged by the WPIM, then the WAPM changes the communication channel and again attempts to establish a reduced power link. For example, in a communication system having 15 available channels, the WAPM may increment to the next available RF channel and again attempt to establish communication with the WPIM. Eventually, once the WAPM has tried all of the available RF channels, the WAPM ceases to attempt to establish a communication link with the WPIM. Preferably, the WAPM cycles through all available channels more than once in order to minimize the impact of transient interference. For example, the WAPM may cycle through all available channels three times before terminating its efforts at establishing communication.

The reduced power linking mode preferably takes place at a power less than the typical transmission power. The linking mode preferably takes place at a lower power because it is assumed that if the WPIM and WAPM are able to communicate at a sufficient level of reliability at the reduced power, then the WPIM and WAPM should be able to communicate with an even greater reliability when the communication power is increased to the regular transmission power. Preferably, the reduced power level during the linking mode is approximately one-half to two-thirds of regular transmission power.

Thus, at step 520, if the linking request signal from the WAPM is not acknowledged by the WPIM, then the WAPM checks to determine if all available RF channels have been tried N times, where N is a predetermined number of times such as three, for example. If all available RF channels have been tried N times, then the WAPM concludes that communication with the WPIM is not possible at this time and terminates its attempts to establish communication with the WPIM at step 535. If the WAPM determines that all available RF channels have not yet been tried, the WAPM selects a new RF channel, for example, by incrementing through the RF channels, at step 540. The WAPM then again attempts to establish communication with the WPIM at step 510.

At Step 550, once the WAPM receives a confirmation from the WPIM that the linking request signal has been received, either the WAPM or the WPIM or both enter a packet error checking mode. During the packet error checking mode, a number of packets of data are exchanged between the WAPM and the WWPIM 400 to determine if the communication link is of acceptable quality. Either the WAPM or the WPIM may transmit to the other or keep statistics to determine the link quality. For example, the WPIM may transmit a number of bits to the WAPM and the WAPM may determine the bit error rate or total number of bit errors received from the WPIM. If the total number of errors is greater than a predetermined threshold, the WAPM may determine that the link is not of sufficient quality and then try the next channel.

Alternatively, both the WPIM and WAPM may transmit a number of bits to each other and both the WPIM and WAPM may determine the number of errors in the received bits. The total number of errors and the receiver receiving the errors may then be statistically combined and compared to a threshold to determine if the error rate is acceptable.

The packet error checking mode preferably occurs at low power similar to the linking mode. As with the linking mode above, the power level during the error check is preferably one-half to two-thirds of the regular power, although the linking modes and error checking mode need not be performed at the same power level.

At step 560, if the error check is successful, then a communication link between the WPIM and WAPM is determined to have been established and bi-directional communication between the WPIM and WAPM may proceed. The WPIM and WAPM preferably provide an indication of the establishment of a successful communication link, for example through the indicators 320, 420 of FIGS. 3 and 4. Additionally, the WAPM preferably provides an indication of which channel has been selected for communication, for example, by blinking one of the visual indicators 324 a number of times equal to the channel number.

If the error check is not successful, then the flowchart proceeds to step 530, just as if the linking request had proved unsuccessful. As described above, if all available channels have not yet been tried three times, the channel is incremented and linking is attempted on the new channel.

Alternatively, the total number of all available channels may be grouped into a plurality of subsets or channel groupings. For example, the fifteen available channels may be grouped into five groups of three. Then instead of attempting communication of each of the available channels, only a single channel of each group may be selected. The channel selected in each group may remain the same each time that group is selected or the selected channel may shift to a new channel when that group is re-selected.

Thus, the reduced power linking mode thus simulates an increase in the RF path loss that might occur in use between the WPIM and WAPM. One of the goals of the reduced power linking mode is to find a communication channel that is presently able to communicate at half of the maximum available communication power. Thus, even if the transmission conditions fluctuate and additional attenuation occurs, the additional attenuation typically does not fluctuate so drastically as to double. Thus, by selecting a communication channel able to communicate with half the available transmission power, a transmission power guard band of half the available transmission power is provided to ensure communication. RF path loss is the amount that a transmitted RF signal is attenuated by the time it reaches a receiver. Environmental changes cause RF path loss to be a dynamic and constantly changing parameter which can change with such things as frequency of transmission, humidity, and arrangement of objects between the point of transmission and the point of reception. Alternatively, although the present embodiment employs a guard band of half the transmission power, some other greater or lesser fraction of the transmission power may be employed.

Preferably, the RF link between the WPIM and WAPM takes place on one of fifteen available RF channels. These fifteen RF channels are preferably equally spaced over a frequency range of 902-928 MHz. This reduced RF power level is established by a command from the control processor 450 of the WPIM and the access/monitoring processor 350 of the WAPM to their respective transceivers 460, 360 during the linking mode. The linking mode is preferably entered by manually putting the WPIM in the linking mode, for example, by depressing a switch, and powering up the WAPM. Also, preferably, once the WPIM is set into linking mode, the WPIM remains in linking mode awaiting a communication from the WAPM for a specific length of time before indicating a failure condition. For example, the WPIM may remain in linking mode for 30 minutes and then indicate a failure condition if an RF communication channel has not been established.

This reduced RF power level provides a pre-determined guard band of RF path loss. This guard band is defined as a difference in transmitted RF power level between the linking mode and the normal operation mode. This guard band is typically 3 dB, such that the transmitted power during the linking mode is half the transmitted power during the normal operation mode. The objective is that, if the WAPM and WPIM are able to establish a reliable link at a lower RF power level during the linking mode, then the RF communication reliability at full RF power (used during normal operation mode) is increased.

In one embodiment, during the reduced power linking mode, the WAPM 300 transmits an RF link request signal from the transceiver 360 of the WAPM 300 to the WPIM transceiver 460 at the reduced power level. The WAPM 300 then awaits a response from the WPIM 400. The WPIM control processor 450, upon determining a valid reception of the RF link request signal from the WAPM 300 by the transceiver 460 of the WPIM 400, commands the transceiver 460 to respond by transmitting an RF acknowledge signal to the WAPM 300, acknowledging the WAPM's link request. Using this handshaking method, the WPIM and WAPM establish a link on an RF channel at a reduced power level.

Thus, the reduced power linking mode may employ reduced power transmissions from either the WAPM 300 to the WPIM 400 or from the WPIM 400 to the WAPM 300, or in both directions between the WAPM 300 and the WPIM 400. For example, reduced power may be selected in a single direction if that direction is typically attenuation-prone. Alternatively, no reduced power linking mode may be employed and the other aspects of the present invention described below may be employed.

Thus, the reduced power linking mode may employ reduced power transmissions from either the WAPM 300 to the WPIM 400 or from the WPIM 400 to the WAPM 300, or in both directions between the WAPM 300 and the WPIM 400. For example, reduced power may be selected in a single direction if that direction is typically attenuation-prone. Alternatively, no reduced power linking mode may be employed and the other aspects of the present invention described below may be employed.

The second aspect of one embodiment is a packet error checking mode. Packets are groups of bits of information that can be transmitted and received by the RF access control system. After a reduced power RF link has been established as previously described, packets of RF signal information are then transmitted and received back and forth between transceivers 460, 360 of the WPIM and the WAPM. Preferably using the actual packet protocol and message structure used during normal operation, the WPIM and WAPM command a pre-determined number of RF packets to be sent back and forth between each other. Preferably, around 200 packets of information are transmitted and received back and forth in a handshaking fashion. This is preferably done at the reduced power level described above. In the preferred implementation of the packet error checking mode, 200 packets of data are exchanged at a rate of about 10 packets per second. Thus, the total packet error check typically takes about 20 seconds. However, the packet error checking mode is not constrained to a certain number of packets or time extent and may range up or down.

The WPIM and WAPM count the number of packet errors that occur or are received during this handshaking exchange of packets. From the error count, the WPIM and/or WAPM determine if the communication link is acceptable.

For example, in one embodiment, the number of errors detected by the WPIM are transmitted by the WPIM transceiver 460 to the WAPM. The number of errors are accumulated in the WAPM 300 where the total number of errors detected by the WPIM 400 and WAPM 300 are compared to a pre-determined threshold value by the access/monitoring processor 350 of the WAPM 300. If the total number of errors is less than the threshold value, then the WAPM flags the link as being valid and thus acceptable for communication, otherwise the WAPM flags the link as being invalid. This aspect of this embodiment provides another RF path loss guard band that checks for RF path loss that varies over time (the time it takes to transmit and receive the packets back and forth). The pre-determined guard bands may be established based on an acceptable packet error rate. For example, an acceptable error packet rate may be 25-30% during the packet error test when No RF retry mechanism is being used. (During normal operation, the RF retry mechanism may be employed to decrease the overall error rate to less than 1%.) If the link is declared as invalid, the installer of the system may manually switch the PIM to another RF channel and restart the linking process again. Alternatively, the WAPM may automatically switch the WAPM transceiver 360 to another RF channel before the linking process may automatically start again.

In an alternative embodiment of the present invention, during the error checking mode, an error bit sequence may be sent from both the WPIM to the WAPM and from the WAPM to the WPIM. Both the WPIM and the WAPM may then maintain their own error rate or other error statistics. The WPIM and WAPM may then negotiate to determine if the RF channel is acceptable. Preferably, the WPIM has the final decision with regard to the acceptability of the RF channel.

Another aspect of one embodiment is valid link establishment indication. If the RF link between the WPIM and WAPM is determined to be valid as previously described, then the WAPM preferably provides a visual and/or audible indication of a valid RF link having been established and also preferably provides an indication of the RF channel number of the valid link. The WAPM and WPIM uses the selected RF channel for all future RF communications during normal operation mode. The indicated RF channel number corresponds to the RF channel over which the reliable link has been established. The visual or audible indicator may be any of a variety of indicators, for example, a LED and/or a beeper on the WAPM 300. The RF channel number may also be expressed in any of a variety of ways by the indicators, for example, a series, from one to fifteen, of green LED flashes and beeps indicates a valid link and the RF channel (one of fifteen) to be used. The indication gives the installer positive feedback about the RF channel to be used. The feedback may be very helpful information when installing or troubleshooting an RF access control system.

Another aspect of one embodiment is that the WPIM may select the RF channel over which the WAPM is to attempt communication with the WPIM. For example, each WPIM may have an identifying address. While the WPIM and WAPM are forming the RF communication link, the WPIM may instruct the WAPM which RF channels to use and the specific WPIM address so that the WAPM may direct communications to a specific WPIM. At the WAPM, the RF channel to use and the WPIM address may then be stored after linking in the access monitoring control processor 350. Preferably, the RF channel and WPIM address are stored in a non-volatile memory so no re-linking is necessary in case power is lost.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. In an RF access control system, a method for establishing a communication link on an RF channel between a first transceiver and a second transceiver of said RF access control system, said method comprising:
   transmitting an RF signal on a first RF channel from a first transceiver to a second transceiver at a first RF power level that is below a second RF power level, wherein said second RF power level is used during normal operation of said RF access control system;
   receiving a pre-determined number of bits at said second transceiver;
   generating an error count corresponding to the number of errors received in said pre-determined number of bits;
   comparing said error count to a pre-determined error threshold; and
   determining said RF channel to be a valid communication link when said error count is less than said predetermined threshold.

2. The method of claim 1 further including the step of transmitting an RF signal on said first RF channel from said second transceiver to said first transceiver at said first RF power level.

3. The method of claim 2 further including the steps of:
   receiving a pre-determined number of bits at said first transceiver;
   generating a second error count corresponding to the number of errors received in said pre-determined number of bits; and
   comparing said second error count to a second pre-determined error threshold.

4. The method of claim 3 further including the step of combining said error count and said second error count to determine whether said RF channel is a valid communication link.

5. The method of claim 1 further including the step of providing an indication of the establishment of a valid communication link at at least one of said first transceiver and said second transceiver.

6. The method of claim 1 wherein said first RF channel is one of a plurality of RF channels, said method further including the step of:
   determining said RF channel to be an invalid communication link when said error count is greater than said predetermined threshold; and
   switching to a second RF channel different from said first RF; and
   performing the transmitting, receiving, generating, comparing and determining steps to determine if said second RF channel is a valid communication link.

7. The method of claim 6 further including the step of providing an indication of the establishment of a valid communication link wherein said indication includes identifying the RF channel forming the valid communication link.

8. The method of claim 6 wherein said method may check each of the available RF channels to attempt to establish a valid communication link.

9. The method of claim 8 wherein each available RF channel is checked a plurality of times.

10. The method of claim 8 wherein at least one of said first transceiver and said second transceiver no longer receive signals after a predetermined amount of time has elapsed.

11. An access control system having a wireless communication link, said system including:
    a first transceiver transmitting a wireless signal composed of a predetermined number of bits on a first channel to said second receiver, wherein said wireless signal is transmitted at a power level less then power level employed during regular data communication;
    a second transceiver receiving said wireless signal and generating an error count corresponding to the number of erroneous bits received in said wireless signal;
    a processor communicating with said second transceiver and comparing said error count to a pre-determined error threshold, said processor determining said channel to be a valid communication link when said error count is less than said predetermined threshold.

12. The system of claim 11 wherein said second transceiver transmits a second wireless signal composed of a predetermined number of bits on said first channel to said first receiver, wherein said wireless signal is transmitted at a power level less then power level employed during regular data communication.

13. The system of claim 12 wherein said first transceiver receives said second wireless signal and generates an second error count corresponding to the number of erroneous bits received in said second wireless signal.

14. The system of claim 13 wherein said processor also communicates with said first transceiver and combines said error count and said second error count to determine whether said RF channel is a valid communication link.

15. The system of claim 11 wherein at least one of said first transceiver and said second transceiver includes an indicator for providing an indication of the establishment of a valid communication link.

16. The system of claim 11 wherein said first wireless channel is one of a plurality of wireless channels and said when said first wireless channel is determined not to be a valid communication link, said first transceiver transmits to said second transceiver on a second wireless channel different from said first wireless channel.

17. The system of claim 16 wherein at least one of said first transceiver and said second transceiver includes an indicator for providing an indication of the establishment of a valid communication link, and wherein said indicator also identifies the wireless channel forming the valid communication link.

18. The system of claim 16 wherein said first transceiver transmits to said second transceiver over each of said plurality of wireless channels to attempt to establish a valid communication link.

19. The system of claim 18 wherein said first transceiver transmits to said second transceiver over each of said plurality of wireless channels a plurality of times.

20. The system of claim 18 wherein at least one of said first transceiver and said second transceiver no longer receive signals after a predetermined amount of time has elapsed.

* * * * *